United States Patent
Krietemeier et al.

(10) Patent No.: US 6,459,999 B1
(45) Date of Patent: Oct. 1, 2002

(54) METHOD FOR DETECTING PHASE FAILURE IN AN ASYNCHRONOUS MACHINE

(75) Inventors: Jürgen Krietemeier, Aerzen; Elmar Hartmann, Hameln; Wolfgang Schnurbusch, Coppenbrügge, all of (DE)

(73) Assignee: Lenze GmbH & Co. KG, Aerzen (DE)

( * ) Notice: Subject to any disclaimer, the term of this patent is extended or adjusted under 35 U.S.C. 154(b) by 0 days.

(21) Appl. No.: 09/445,714

(22) PCT Filed: Apr. 14, 1999

(86) PCT No.: PCT/EP99/02486

§ 371 (c)(1),
(2), (4) Date: Dec. 9, 1999

(87) PCT Pub. No.: WO99/54979

PCT Pub. Date: Oct. 28, 1999

(30) Foreign Application Priority Data

Apr. 17, 1999 (DE) .......................................... 198 17 224

(51) Int. Cl.[7] .................. H02P 5/28; H02P 1/04
(52) U.S. Cl. .................. 702/65; 324/772; 324/76.77; 318/799
(58) Field of Search ................... 324/512, 521, 324/772, 76.77; 702/60, 65, 38; 318/727, 798, 799, 805, 806, 807, 808, 809, 812

(56) References Cited

U.S. PATENT DOCUMENTS 5,471,127 A * 11/1995 Vaughan et al. ............. 318/809
5,514,978 A * 5/1996 Koegl et al. ................. 324/772
5,521,482 A * 5/1996 Lang et al. .................. 318/800
6,128,583 A * 10/2000 Dowling ....................... 702/58
6,308,140 B1 * 10/2001 Dowling et al. .............. 702/60

OTHER PUBLICATIONS

Watson, "The Use of Line Current as a Condition Monitoring Tool for Three Phase Induction Motors", IEEE, 1998.*

* cited by examiner

*Primary Examiner*—Patrick Assouad
(74) *Attorney, Agent, or Firm*—Charles E. Baxley

(57) ABSTRACT

In order to identify phase failure in an asynchronous machine, monitoring of the phase currents is performed, a trigger signal being generated for each phase in the event of a limit value being undershot. In order to cover the entire frequency range in converter operation, a changeover is made between different monitoring states. In the first monitoring state, the trigger signal is generated if the instantaneous value of the phase current in each case falls below the limit value. A changeover is then always made to the second monitoring state, where the duration of the trigger signal is compared with the swept angle of rotation of the voltage vector in the same phase. If the state of the phase current lasts during this period of time, in a third monitoring state the duration of the trigger signal or the continuance of the phase current state is checked during a defined delay time interval. If the trigger signal outlasts the delay time interval, phase failure is signaled.

3 Claims, 2 Drawing Sheets

METHOD FOR DETECTING PHASE FAILURE IN AN ASYNCHRONOUS MACHINE

BACKGROUND OF THE INVENTION

1. Field of the Invention

The present invention relates generally to the field of electrical machinery and more particularly to a method for identifying phase failure in an asynchronous machine.

2. The Prior Art

The prior art includes German Patent DE 32 28 954 C2, wherein for each phase of an asynchronous motor an electrical signal corresponding to the root-mean-square value of the respective phase current is generated. This signal is compared with a presettable limit value in a comparison circuit. If this limit value is deviated from, a switch-off signal is generated in order to protect the asynchronous motor. Furthermore, a comparison of all the signals which represent the root-mean-square value of all the phase currents is additionally provided in order to generate the switch-off signal in the event of a deviation from a presettable difference. Since, in the case of a power converter-fed asynchronous machine, such a protective device functions only above a specific frequency, in the event of a predetermined frequency limit being undershot, a voltage comparison must additionally be performed in order to check the voltage respectively applied to the asynchronous motor with regard to correspondence to the desired voltage of the converter associated with the instantaneous frequency. The previously known protective device essentially involves generating the switch-off signal in the event of a deviation from the current balance.

A circuit arrangement for identifying a phase failure in a three-phase motor is shown in German patent specification DE 23 03 993 A1. This circuit operates according to a similar method. In this case too the indication of the phase failure functions only above a specific frequency which is determined by the time constant of the filter in the comparison circuit. Therefore, there is no indication of a fault at small rotating field frequencies in the event of a phase failure and, consequently, all of the operating states and/or operating points of an asynchronous machine cannot thereby be monitored.

OBJECTS AND SUMMARY OF THE INVENTION

It is therefore an object of the present invention to provide a method for identifying phase failure in an asynchronous machine which operates over the entire frequency range of the system.

Yet another object of the present invention is to provide a method for identifying phase failure in an asynchronous machine which operates from standstill up to the maximum frequency of the system including direct-current feeding.

The foregoing and other objects and advantages of the present invention will appear more clearly hereinafter.

In accordance with the present invention there is provided a method for identifying the failure of a phase of a converter-controlled three-phase asynchronous machine which includes monitoring of at least two phase currents in a respective monitoring stage of a monitoring circuit. The monitoring circuit which generates a trigger signal in the event of a limit value for the relevant monitoring stage being undershot.

In the first monitoring state in each monitoring stage, the instantaneous value of the phase current is compared with the limit value and the trigger signal is generated during the undershooting of the limit value, after which, given the presence of the trigger signal, a changeover is made from the first to a second monitoring state. In the second monitoring state, the duration of the trigger signal is compared with the angle of rotation swept by the voltage vector of the phase, the voltage vector concomitantly rotating with the rotating field, in which case, in the event of the trigger signal being present over a predetermined rotating field angle, a transition is made to a third monitoring stage. In the third monitoring stage the presence of the trigger signal is checked during a defined delay time interval, phase failure being signaled in the event of said delay time interval being outlasted by the trigger signal.

What is essential for the invention is that the generation of the trigger signal is based on the instantaneous values of the phase currents and the trigger signal is present constantly while the instantaneous value of the phase current falls below the presettable limit value in each of the monitoring stages. For the operating state of an asynchronous machine it is entirely normal for the instantaneous values of the phase currents to fall below the limit value and also pass through a zero value; consequently, the trigger signal is generated each time in these cases in the first monitoring state. This trigger signal, however, has a short time duration. Therefore, in the second monitoring stage, a check is made to see whether the phase current of the relevant phase normally lags behind the voltage vector or desired motor voltage indicator and exceeds the limit value again in a predetermined unit of time, whereby the trigger signal is then obviated. In this normal case, a changeover is immediately made back to the first monitoring state again. However, if the trigger signal is present for longer than the temporal requirement of the voltage vector to sweep the predetermined angle of rotation, then a changeover is made to the third monitoring stage, where the duration of the trigger signal is compared with the defined delay time interval, phase failure being signaled when the duration of the trigger signal exceeds the delay time interval. The filter function in the third monitoring stage prevents premature or incorrect triggering of the phase-failure signal, which is advantageous particularly in the field-weakening range.

For practical operation it is expedient to define the comparison angle of rotation for the voltage vector in the second monitoring state as 90 degrees electrical. The angle of rotation of the voltage vector is equivalent to the rotating field angle, and it is understood that the rotating field angle covered in a unit of time is proportional to the rotating field frequency. In normal operation of the asynchronous machine, the phase current changes during the sweeping of the predetermined angle of rotation by the voltage vector and exceeds the present limit value. If, by contrast, the phase current does not change during this period of time, the asynchronous machine is deviating from its normal operating behavior and a fault is probably present, which fault results in the signaling of the phase failure and switching off of the asynchronous machine in any case when the fault criterion is fulfilled in the third monitoring stage.

The method according to the present invention is particularly suitable for converter control of the entire drive system, whereby the corresponding values can be picked off at the converter output. It is not necessary to monitor all three phases in the case of the feeding of a three-phase asynchronous machine, since the instantaneous value of the third phase current can in each case be calculated from two detected phase currents. Thus, a further conceivable case is one in which during the monitoring of two of the three phase currents, both instantaneous values of the monitored phase currents are smaller than the comparator threshold, that is to say lie below the predetermined limit value. In this situation, a separate, independent time measurement is started from zero and outlasts a separate delay time interval. If the state remains constant, in other words if the instantaneous values of the phase currents do not exceed the comparator threshold, phase failure of the asynchronous machine is likewise signaled and, if appropriate, shutdown is initiated. However, this can also means that no asynchronous machine at all is connected to the converter or the connection of the asynchronous machine is not in order.

Overall, the method according to the invention is suitable both for current-regulated and for voltage-controlled converters, and the entire moment range of the connected asynchronous machine is covered, including no-load running, in any desired direction of rotation; in other words, the monitoring functions during operation in all four quadrants of the M/n characteristic curve of the asynchronous machine. Moreover, a simultaneous failure of a plurality of phases of the asynchronous machine is identified and, ultimately, the method according to the invention can also be applied analogously to other polyphase systems.

DESCRIPTION OF THE DRAWINGS

Other important objects and advantages of the present invention will be apparent from the following detailed description taken in connection with the accompanying drawings in which.

DETAILED DESCRIPTION OF THE INVENTION

Figure 1:
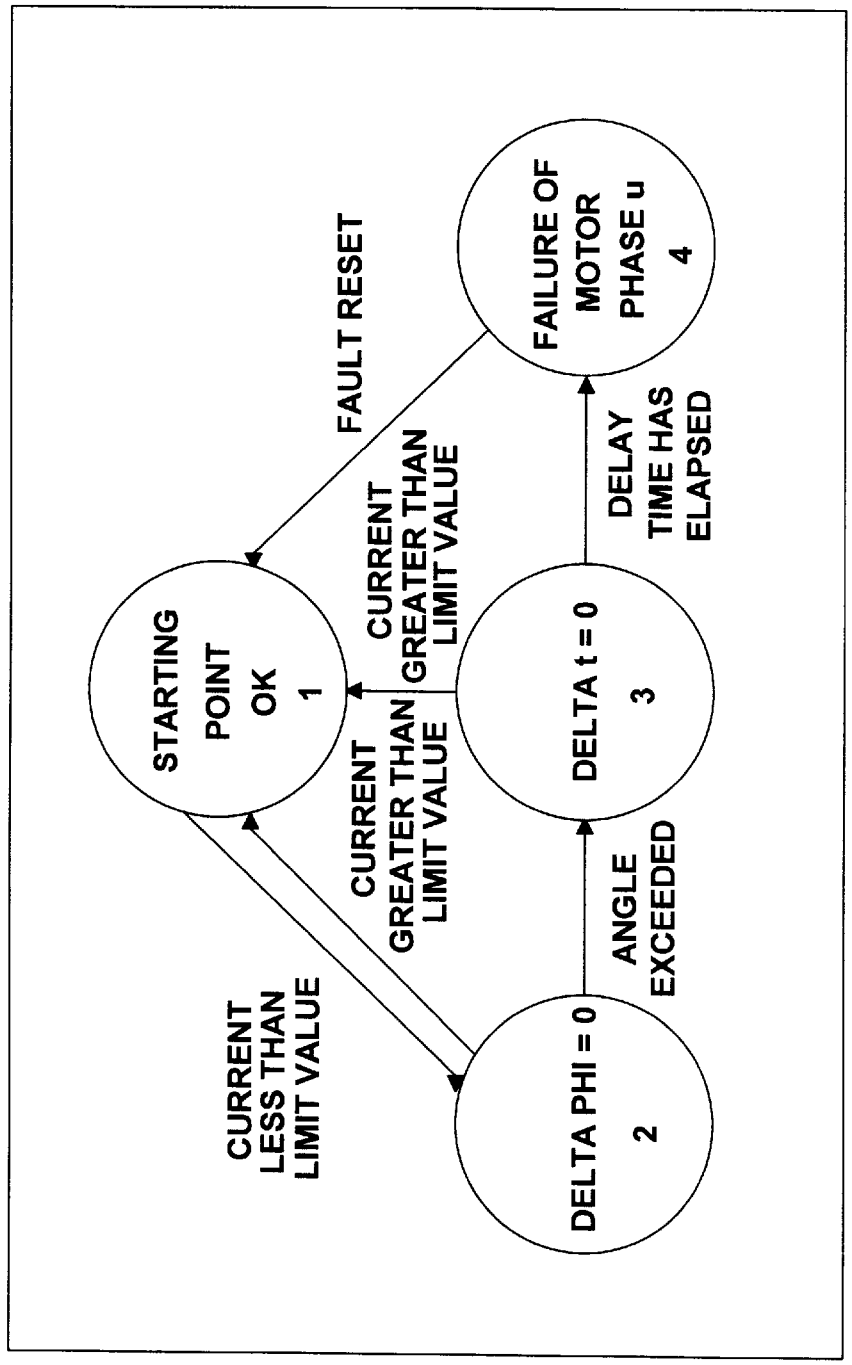
FIG. 1 is a state diagram for motor phase U.
Figure 2:
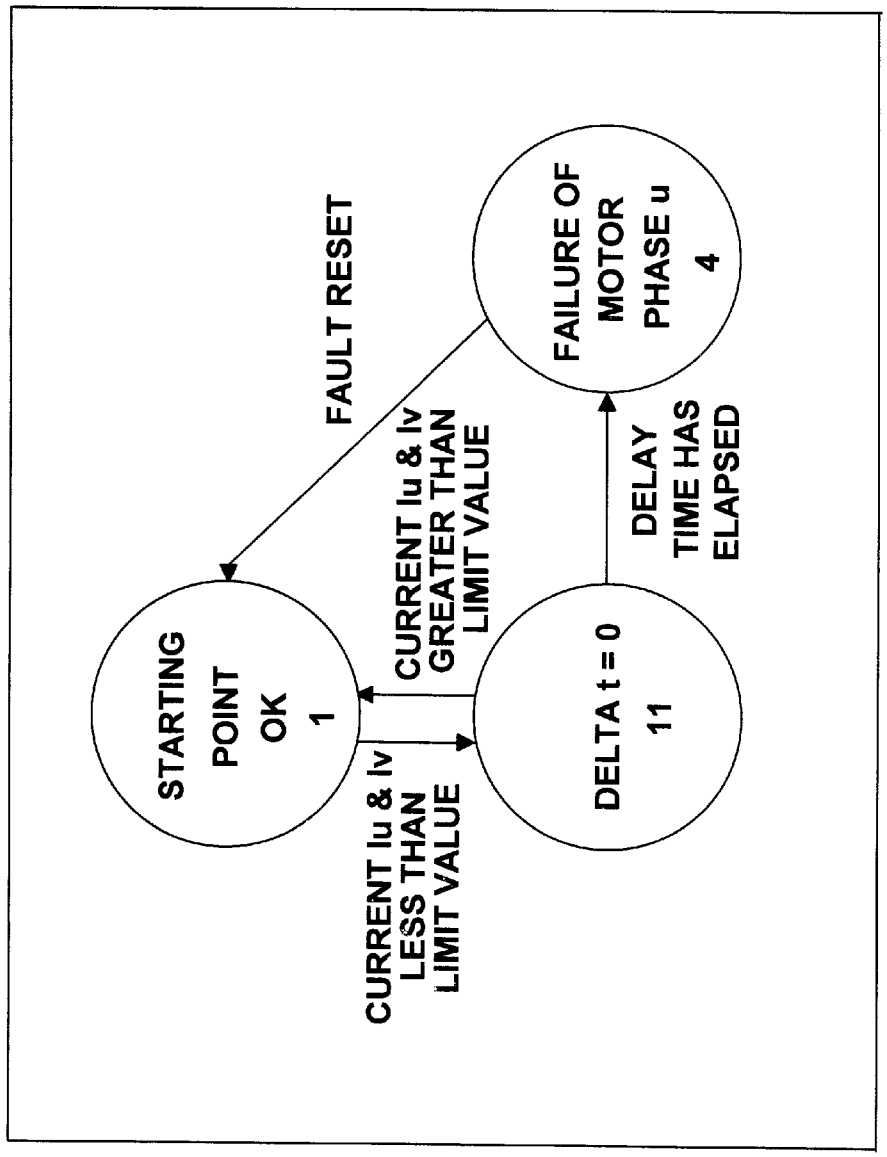
FIG. 2 is a state diagram for monitoring simultaneous motor phase failure.

With reference to the drawings, wherein like reference numbers designate like or corresponding parts throughout, there is shown in FIGS. 1 and 2 a state diagram for motor phases and a state diagram for monitoring simultaneous motor phase failure which describe a method for identifying phase failure in an asynchronous machine in accordance with the present invention.

In FIGS. 1 and 2 the individual states are illustrated by the information in the circles, the signal exchange being represented by arrows. These arrows represent the so-called trigger signal which, each time the comparator threshold is undershot, is present or is omitted, which corresponds to the opposite direction of the arrows.

In accordance with the present invention the instantaneous values of the three motor currents are detected simultaneously and monitored by a window comparator in each case; this is the monitoring state 1. The monitoring window is arranged in a mirror-inverted fashion around the zero point; the limit values for the comparison with the instantaneous values of the phase currents are set appropriately in each case. As a rule, it may be assumed that the limit values shall be approximately 2% to 5% of the rated motor current. If the instantaneous value of the phase current falls below the set limit value, the monitoring changes over to the monitoring state 2 assigned to the phase. The voltage vector in this phase is then used for the comparison. If the voltage vector has swept an angle of 90 degrees electrical and if, during this period of time, the instantaneous value of the motor current in this phase has not exceeded the comparator limit, then the changeover to the monitoring state 3 is made. Otherwise, the monitoring system changes back over to the state 1. The independent angle observation is begun in a manner associated with the respective phase of the instantaneous desired voltage angle, an angle difference of 90 degrees electrical being involved in each case. In contrast to the electrical angle of rotation there is the mechanical angle of rotation which is covered in the same time by the rotor of the asynchronous machine. As is known, the mechanical and electrical angles are linked to one another via the number of motor poles.

In the monitoring state 3, an independent time measurement is started from zero in the comparator. This time measurement outlasts a predetermined delay time interval and if the state of the motor phase current remains unchanged during this delay time interval, a changeover is made from the monitoring state 3 to the state 4. The state 4 means that phase failure is signaled and, if appropriate, the asynchronous machine connected to the converter is switched off. The state 4 can be left by way of a reset signal.

It shall be emphasized once again that the changeover from the monitoring states 2 or 3 to the monitoring state 1 is made immediately as soon as the instantaneous value of the current in the relevant motor phase exceeds the limit value respectively set.

It is not necessary to measure all three phase currents of the asynchronous machine; it is sufficient if the third phase current is calculated. For this purpose, the currents Iu and Iv are measured and the third current Iw is formed by subtraction of the two measured currents. If one of the three phase currents Iu, Iv, Iw has a magnitude smaller than the comparator threshold, the monitoring becomes active.

FIG. 1 shows the state diagrams for the two further motor phases U and W. Thus, if appropriate, the monitoring state 2 and the monitoring state 3 are passed through for each motor phase.

Simultaneous failure of two phases of the asynchronous machine means that the magnitudes of the phase currents Iu and Iv simultaneously become smaller than the comparator threshold, in accordance with the enabling of the inverter. In this case a changeover is made from the monitoring state 1 to the monitoring state designated by 11.

In the monitoring state 11, an independent time measurement is again started from zero in a manner associated with the comparator. If the state of the two phase currents is constant over the set delay time interval, a changeover is again made from the monitoring state 11 to the state 4. Otherwise, in other words, if the comparator output changes in the monitoring state 11, there is a return to the monitoring state 1. In the event of a changeover to the state 4, motor phase failure is signaled in this case too and the state 4 can be left again by way of a reset signal.

The foregoing specific embodiments of the present invention as set forth in the specification herein are for illustrative purposes only. Various deviations and modifications can be made within the spirit and scope of this invention, without departing from the main theme thereof.

What is claimed is:

1. A method for identifying the failure of a phase of a converter-controlled three-phase asynchronous machine, comprising the steps of:

a) providing a monitoring circuit having a first monitoring state, a second monitoring state, a third monitoring state, and a fourth monitoring state;

b) comparing the instantaneous value of the phase current with a limit value when said monitoring circuit is in said first monitoring state;

c) generating a trigger signal responsive to undershooting of said limit value when said monitoring circuit is in said first monitoring state;
d) changing from said first monitoring state to said second monitoring state responsive to presence of said trigger signal when said monitoring circuit is in said first monitoring state;
e) comparing said trigger signal with the angle of rotation swept by the voltage vector of the phase which rotates with the rotating field;
f) changing from said second monitoring state to said third monitoring state responsive to presence of said trigger signal greater than a predetermined field angle;
g) comparing said trigger signal with a predetermined delay time interval; and
h) changing from said third monitoring state to said fourth monitoring state and signaling phase failure in the event of presence of said trigger signal greater than said predetermined delay time interval.

2. The method for identifying phase failure in an asynchronous machine as claimed in claim 1, wherein in said second monitoring state said step of comparing said trigger signal with said angle of rotation swept by the voltage vector of the phase which rotates with the rotating field further comprises a comparison angle of ninety degrees (90°) electrical.

3. The method for identifying phase failure in an asynchronous machine as claimed in claim 1, further comprising the steps of:

starting a time measurement relative to a preselected delay time interval responsive to the event of instantaneous values of two phase currents falling below a preselected low limit simultaneously as indicated by trigger signals of respectively associated monitoring stages; and signaling phase failure responsive to said delay time interval being outlasted by said trigger signals.

* * * * *